United States Patent
Zavala Jurado et al.

(10) Patent No.: US 10,859,159 B2
(45) Date of Patent: Dec. 8, 2020

(54) MODEL PREDICTIVE CONTROL OF TORQUE CONVERTER CLUTCH SLIP

(71) Applicant: GM Global Technology Operations LLC, Detroit, MI (US)

(72) Inventors: Jose C. Zavala Jurado, Brighton, MI (US); Gionata Cimini, Milan (IT); Bryan P. Jagielo, Royal Oak, MI (US); Zhen Zhang, West Bloomfield, MI (US); Yue-Yun Wang, Troy, MI (US); Harinath Atmaram, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 76 days.

(21) Appl. No.: 16/272,568

(22) Filed: Feb. 11, 2019

(65) Prior Publication Data
US 2020/0256459 A1 Aug. 13, 2020

(51) Int. Cl.
*F16H 61/14* (2006.01)
*F16H 59/14* (2006.01)

(52) U.S. Cl.
CPC .......... *F16H 61/143* (2013.01); *F16H 59/14* (2013.01); *F16H 2061/145* (2013.01)

(58) Field of Classification Search
CPC ... F16H 61/143; F16H 2061/145; F16H 59/14
See application file for complete search history.

(56) References Cited

U.S. PATENT DOCUMENTS

| | | | |
|---|---|---|---|
| 4,161,929 A | 7/1979 | Nohira et al. | |
| 5,101,786 A | 4/1992 | Kamio et al. | |
| 5,531,302 A * | 7/1996 | Koenig | F16H 61/143 192/3.3 |
| 5,706,780 A | 1/1998 | Shirakawa | |

(Continued)

FOREIGN PATENT DOCUMENTS

| | | |
|---|---|---|
| CN | 1594846 A | 3/2005 |
| WO | 2003065135 A1 | 8/2003 |

OTHER PUBLICATIONS

John C.G. Boot, "Quadratic Programming: Algorithms, Anomalies, Applications, vol. 2 of Studies in Mathematical and Managerial Economics," North Holland Publ. Comp., 1964; 213 pages.

(Continued)

*Primary Examiner* — David R Morris (57) ABSTRACT

A control system to control slip of a torque converter clutch includes a clutch plant model configured to predict a value of a parameter that relates to torque converter clutch slip as a function of clutch plant model inputs comprising commanded clutch pressure and of torque from the torque generative device. The control system also includes a model predictive controller configured to receive signals that allow determination of a desired value of the parameter that relates to torque converter clutch slip and a predicted value of the parameter that relates to torque converter clutch slip, receive a signal representing reported torque of the torque generative device, identify an optimal commanded clutch pressure value that will result in an optimal value of an objective (Continued)

function based on the clutch plant model, and provide a command signal to an actuator effective to control commanded clutch pressure to the torque converter clutch.

18 Claims, 3 Drawing Sheets

(56) References Cited

U.S. PATENT DOCUMENTS

| | | | |
|---|---|---|---|
| 5,727,528 A | 3/1998 | Hori et al. | |
| 5,775,293 A | 7/1998 | Kresse | |
| 5,921,219 A | 7/1999 | Frohlich et al. | |
| 6,014,955 A | 1/2000 | Hosotani et al. | |
| 6,155,230 A | 12/2000 | Iwano et al. | |
| 6,173,226 B1 | 1/2001 | Yoshida | |
| 6,276,333 B1 | 8/2001 | Kazama et al. | |
| 6,532,935 B2 | 3/2003 | Ganser et al. | |
| 6,606,981 B2 | 8/2003 | Itovama | |
| 6,704,638 B2 | 3/2004 | Livshiz et al. | |
| 6,704,641 B2 | 3/2004 | Tashiro et al. | |
| 6,826,904 B2 | 12/2004 | Miura | |
| 6,840,215 B1 | 1/2005 | Livshiz et al. | |
| 6,953,024 B2 | 10/2005 | Linna et al. | |
| 6,993,901 B2 | 2/2006 | Shirakawa | |
| 7,016,779 B2 | 3/2006 | Bowyer | |
| 7,021,282 B1 | 4/2006 | Livshiz et al. | |
| 7,051,058 B2 | 5/2006 | Wagner et al. | |
| 7,222,012 B2 | 5/2007 | Simon, Jr. | |
| 7,235,034 B2 | 6/2007 | Berglund et al. | |
| 7,236,874 B2 | 6/2007 | Ichihara | |
| 7,274,986 B2 | 9/2007 | Petridis et al. | |
| 7,275,518 B1 | 10/2007 | Gartner et al. | |
| 7,356,403 B2 | 4/2008 | Yoshioka et al. | |
| 7,395,147 B2 | 7/2008 | Livshiz et al. | |
| 7,400,967 B2 | 7/2008 | Ueno et al. | |
| 7,433,775 B2 | 10/2008 | Livshiz et al. | |
| 7,441,544 B2 | 10/2008 | Hagari | |
| 7,546,196 B2 | 6/2009 | Izumi et al. | |
| 7,563,194 B2 | 7/2009 | Murray | |
| 7,584,041 B2 * | 9/2009 | Lee | F16H 61/143 701/51 |
| 7,614,384 B2 | 11/2009 | Livshiz et al. | |
| 7,698,048 B2 | 4/2010 | Jung | |
| 7,703,439 B2 | 4/2010 | Russell et al. | |
| 7,715,975 B2 | 5/2010 | Yamaoka et al. | |
| 7,775,195 B2 | 8/2010 | Schondorf et al. | |
| 7,777,439 B2 | 8/2010 | Falkenstein | |
| 7,813,869 B2 | 10/2010 | Grichnik et al. | |
| 7,854,683 B2 * | 12/2010 | DeGeorge | F16H 61/143 477/168 |
| 7,885,756 B2 | 2/2011 | Livshiz et al. | |
| 7,941,260 B2 | 5/2011 | Lee et al. | |
| 7,949,459 B2 | 5/2011 | Yoshikawa et al. | |
| 7,967,720 B2 | 6/2011 | Martin et al. | |
| 7,967,729 B2 | 6/2011 | Martin et al. | |
| 7,975,668 B2 | 7/2011 | Ramappan et al. | |
| 7,980,221 B2 | 7/2011 | Baur et al. | |
| 8,010,272 B2 | 8/2011 | Kuwahara et al. | |
| 8,027,780 B2 | 9/2011 | Whitney et al. | |
| 8,041,487 B2 | 10/2011 | Worthing et al. | |
| 8,050,841 B2 | 11/2011 | Costin et al. | |
| 8,073,610 B2 | 12/2011 | Heap et al. | |
| 8,078,371 B2 | 12/2011 | Cawthorne | |
| 8,086,390 B2 | 12/2011 | Whitney et al. | |
| 8,103,425 B2 | 1/2012 | Choi et al. | |
| 8,103,428 B2 | 1/2012 | Russ et al. | |
| 8,116,954 B2 | 2/2012 | Livshiz et al. | |
| 8,121,763 B2 | 2/2012 | Hou | |
| 8,176,735 B2 | 5/2012 | Komatsu | |
| 8,181,627 B2 | 5/2012 | Sharples et al. | |
| 8,209,102 B2 | 6/2012 | Wang et al. | |
| 8,209,104 B2 | 6/2012 | Soejima et al. | |
| 8,219,304 B2 | 7/2012 | Soma | |
| 8,241,177 B2 | 8/2012 | Doering et al. | |
| 8,307,814 B2 | 11/2012 | Leroy et al. | |
| 8,316,828 B2 | 11/2012 | Whitney et al. | |
| 8,332,109 B2 * | 12/2012 | Otanez | B60W 50/06 477/115 |
| 8,447,492 B2 | 5/2013 | Watanabe et al. | |
| 8,463,515 B2 * | 6/2013 | Hebbale | F16H 61/143 475/125 |
| 8,468,821 B2 | 6/2013 | Liu et al. | |
| 8,483,935 B2 | 7/2013 | Whitney et al. | |
| 8,489,298 B2 * | 7/2013 | Otanez | F16H 61/143 477/166 |
| 8,527,120 B2 | 9/2013 | Matthews et al. | |
| 8,560,204 B2 | 10/2013 | Simon et al. | |
| 8,566,008 B2 | 10/2013 | Soejima et al. | |
| 8,593,806 B2 | 11/2013 | Huang | |
| 8,594,904 B2 | 11/2013 | Livshiz et al. | |
| 8,635,001 B2 | 1/2014 | Doering et al. | |
| 8,739,766 B2 | 6/2014 | Jentz et al. | |
| 8,744,716 B2 | 6/2014 | Kar | |
| 8,862,248 B2 | 10/2014 | Yasui | |
| 8,954,257 B2 | 2/2015 | Livshiz et al. | |
| 8,977,457 B2 | 3/2015 | Robinette et al. | |
| 9,031,766 B2 | 5/2015 | DeLaSalle et al. | |
| 9,062,631 B2 | 6/2015 | Kinugawa et al. | |
| 9,067,593 B2 | 6/2015 | Dufford | |
| 9,075,406 B2 | 7/2015 | Nakada | |
| 9,145,841 B2 | 9/2015 | Miyazaki et al. | |
| 9,175,622 B2 | 11/2015 | Seiberlich et al. | |
| 9,175,628 B2 | 11/2015 | Livshiz et al. | |
| 9,222,426 B2 | 12/2015 | Rollinger et al. | |
| 9,243,524 B2 | 1/2016 | Whitney et al. | |
| 9,328,671 B2 | 5/2016 | Whitney et al. | |
| 9,334,815 B2 | 5/2016 | Cygan, Jr. et al. | |
| 9,347,381 B2 | 5/2016 | Long et al. | |
| 9,376,965 B2 | 6/2016 | Whitney et al. | |
| 9,378,594 B2 | 6/2016 | Wong et al. | |
| 9,382,865 B2 | 7/2016 | Genslak et al. | |
| 9,388,754 B2 | 7/2016 | Cygan, Jr. et al. | |
| 9,388,758 B2 | 7/2016 | Pochner et al. | |
| 9,399,959 B2 | 7/2016 | Whitney et al. | |
| 9,429,085 B2 | 8/2016 | Whitney et al. | |
| 9,435,274 B2 | 9/2016 | Wong et al. | |
| 9,447,632 B2 | 9/2016 | LeBlanc | |
| 9,528,453 B2 | 12/2016 | Whitney et al. | |
| 9,534,547 B2 | 1/2017 | Livshiz et al. | |
| 9,541,019 B2 | 1/2017 | Verdejo et al. | |
| 9,587,573 B2 | 3/2017 | Genslak et al. | |
| 9,599,049 B2 | 3/2017 | Zavala Jurado et al. | |
| 9,599,053 B2 | 3/2017 | Long et al. | |
| 9,605,615 B2 | 3/2017 | Long et al. | |
| 9,669,822 B2 | 6/2017 | Piper et al. | |
| 9,714,616 B2 | 7/2017 | Jin et al. | |
| 9,732,499 B2 | 8/2017 | Miyamoto et al. | |
| 9,732,688 B2 | 8/2017 | Cygan, Jr. et al. | |
| 9,765,703 B2 | 9/2017 | Whitney et al. | |
| 9,784,198 B2 | 10/2017 | Long et al. | |
| 9,789,876 B1 | 10/2017 | Livshiz et al. | |
| 9,797,318 B2 | 10/2017 | Storch et al. | |
| 9,863,345 B2 | 1/2018 | Wong et al. | |
| 9,879,769 B2 * | 1/2018 | Zhang | F16H 45/02 |
| 9,920,697 B2 | 3/2018 | Pochner et al. | |
| 9,927,780 B2 | 3/2018 | Sun et al. | |
| 9,963,150 B2 | 5/2018 | Livshiz et al. | |
| 9,989,150 B2 | 6/2018 | Yamanaka et al. | |
| 10,047,686 B2 | 8/2018 | Jin | |
| 10,094,300 B2 | 10/2018 | Cygan, Jr. et al. | |
| 10,119,481 B2 | 11/2018 | Livshiz et al. | |
| 10,125,712 B2 | 11/2018 | Livshiz et al. | |
| 10,167,746 B2 | 1/2019 | Whitney et al. | |
| 10,196,956 B2 | 2/2019 | Alfieri et al. | |
| 10,273,900 B2 | 4/2019 | Whitney et al. | |
| 10,358,140 B2 | 7/2019 | Livshiz et al. | |
| 10,399,574 B2 | 9/2019 | Livshiz et al. | |
| 10,450,972 B2 | 10/2019 | Pochner et al. | |
| 2004/0116220 A1 | 6/2004 | Yamamoto et al. | |
| 2005/0065691 A1 | 3/2005 | Cho | |
| 2007/0191181 A1 | 8/2007 | Burns | |
| 2007/0287594 A1 * | 12/2007 | DeGeorge | F16H 61/143 477/176 |

(56) References Cited

U.S. PATENT DOCUMENTS

| | | | |
|---|---|---|---|
| 2009/0192017 A1* | 7/2009 | Lee | F16H 61/143 477/169 |
| 2009/0288899 A1 | 11/2009 | Belloso | |
| 2010/0211294 A1 | 8/2010 | Soejima | |
| 2011/0053720 A1 | 3/2011 | Kang et al. | |
| 2011/0060509 A1* | 3/2011 | Otanez | F16H 61/143 701/58 |
| 2011/0166757 A1* | 7/2011 | Otanez | F16H 61/143 701/60 |
| 2012/0010860 A1 | 1/2012 | Kirkling et al. | |
| 2012/0035819 A1* | 2/2012 | Hebbale | F16H 61/00 701/60 |
| 2017/0016407 A1 | 1/2017 | Whitney et al. | |
| 2017/0082055 A1 | 3/2017 | Cygan, Jr. et al. | |
| 2017/0292594 A1* | 10/2017 | Zhang | F16H 61/143 |
| 2018/0293814 A1 | 10/2018 | Gilbert et al. | |
| 2019/0301387 A1 | 10/2019 | Jin et al. | |
| 2019/0308626 A1 | 10/2019 | Otanez et al. | |
| 2019/0353071 A1 | 11/2019 | Camuglia et al. | |
| 2020/0130692 A1* | 4/2020 | Livshiz | B60W 30/188 |
| 2020/0166126 A1* | 5/2020 | Jagielo | F16H 61/143 |

OTHER PUBLICATIONS

N. Lawrence Ricker, "Use of Quadratic Programming for Constrained Internal Model Control," Ind. Eng. Chem. Process Des. Dev., 1985, pp. 925-936.

C. E. Lemke, "A Method of Solution for Quadratic Programs," Rensselaer Polytechnic Institute, Troy, New York, Published Online: Jul. 1, 1962, pp. 442-453.

Kolmanovsky I., "Towards Engine and Powertrain Control Based on Model Predictive Control," Sep. 28, 2012, Powerpoint Presentation, 47 slides.

Gorinevsky, Lecture 14—Model Predictive Control Part 1: The Concept, Spring 2005, Powerpoint Presentation, 26 slides.

Bemporad, Alberto, "Model Predictive Control," Spring 2005, Powerpoint Presentation, 94 slides.

Boyd, S., "Model Predictive Control," Powerpoint Presentation, 25 slides.

U.S. Appl. No. 16/174,670, filed Oct. 30, 2018 by GM Global Technology Operations LLC, titled "Steady State Control of Model Predictive Control Based Powertrain With Continuously Variable Transmission".

* cited by examiner

MODEL PREDICTIVE CONTROL OF TORQUE CONVERTER CLUTCH SLIP

INTRODUCTION

The present disclosure relates to control of slip in a torque converter clutch (TCC), and more specifically to control of TCC slip using model predictive control (MPC).

Torque converters are commonly used to transfer drive torque from a torque generative device to a transmission. A torque converter can provide torque multiplication, smooth ratio changing on acceleration, and good torsional vibration damping. Because a torque converter uses fluid coupling between its input and its output, there are inherent inefficiencies due to losses in the fluid. To realize better fuel economy, auto makers use a locking clutch, known as a torque converter clutch or TCC, to mechanically lock the input to the output to reduce losses at steady state speed conditions. In lower gears and at low vehicle speeds, the TCC cannot be locked because a locked drivetrain would pose drivability concerns. In order to strike a balance between vehicle drivability and fuel economy, systems have been developed that control the TCC to allow a small rotational speed difference, also known as slip, between the torque converter input and output.

Improvements in TCC slip control are desired to allow further improvements in vehicle drivability and fuel economy.

SUMMARY

According to several aspects, a control system to control slip of a torque converter clutch in a powertrain comprising a torque generative device and a torque converter comprising a torque converter clutch, the control system includes a clutch plant model configured to predict a value of a parameter that relates to torque converter clutch slip as a function of clutch plant model inputs comprising commanded clutch pressure and of torque from the torque generative device. The control system also includes a model predictive controller configured to receive signals that allow determination of a desired value of the parameter that relates to torque converter clutch slip and a predicted value of the parameter that relates to torque converter clutch slip. The model predictive controller is further configured to receive a signal representing reported torque of the torque generative device, identify an optimal commanded clutch pressure value that will result in an optimal value of an objective function based on the clutch plant model, and provide a command signal to an actuator effective to control commanded clutch pressure to the torque converter clutch.

In a further aspect of the disclosed control system, the objective function includes a difference between the desired and predicted values of the parameter that relates to clutch slip, rate of change of clutch pressure, and a difference between a desired and a predicted value of commanded clutch pressure.

In another aspect of the disclosed control system, the objective function includes constraints on the commanded clutch pressure, on the rate of change of clutch pressure, and on the parameter that relates to clutch slip.

In an additional aspect of the disclosed control system, the model predictive controller receives inputs comprising the desired value of the parameter that relates to clutch slip, the predicted value of the parameter that relates to clutch slip, and the torque from the torque generative device.

In a further aspect of the disclosed control system, the parameter that relates to clutch slip is clutch torque.

In an additional further aspect of the disclosed control system, the clutch torque is calculated based in part on an estimate of hydraulic torque transmitted from an impeller to a turbine in the torque converter.

In a further aspect of the disclosed control system, the estimate of hydraulic torque is based on a k-factor calculation.

In another aspect of the disclosed control system, the parameter that relates to clutch slip is clutch slip.

In a further aspect of the disclosed control system, the clutch plant model inputs further comprise an estimate of hydraulic torque transmitted from an impeller to a turbine in the torque converter.

In a further aspect of the disclosed control system, the hydraulic torque is estimated by a second order polynomial of slip.

According to several aspects, a method of controlling slip of a torque converter clutch in a powertrain comprising a torque generative device and a torque converter comprising a torque converter clutch, the method includes predicting in a clutch plant model a value of a parameter that relates to torque converter clutch slip as a function of clutch plant model inputs comprising commanded clutch pressure and of torque from the torque generative device. The method further includes receiving in a model predictive controller signals that allow determination of a desired value of the parameter that relates to torque converter clutch slip and a predicted value of the parameter that relates to torque converter clutch slip, receiving in the model predictive controller a signal representing reported torque of the torque generative device, identifying in the model predictive controller an optimal commanded clutch pressure value that will result in an optimal value of an objective function based on the clutch plant model, and providing a command signal to an actuator effective to control commanded clutch pressure to the torque converter clutch.

In a further aspect of the disclosed method, the objective function includes a difference between the desired and predicted values of the parameter that relates to clutch slip, rate of change of clutch pressure, and a difference between a desired and a predicted value of commanded clutch pressure.

In a further aspect of the disclosed method, the objective function includes constraints on the commanded clutch pressure, on the rate of change of clutch pressure, and on the parameter that relates to clutch slip.

In an additional aspect of the disclosed method, the model predictive controller receives inputs comprising the desired value of the parameter that relates to clutch slip, the predicted value of the parameter that relates to clutch slip, and the torque from the torque generative device.

In another aspect of the disclosed method, the parameter that relates to clutch slip is clutch torque.

In a further aspect of the disclosed method, the clutch torque is calculated based in part on an estimate of hydraulic torque transmitted from an impeller to a turbine in the torque converter.

In an additional aspect of the disclosed method, the estimate of hydraulic torque is based on a k-factor calculation.

In another aspect of the disclosed method, the parameter that relates to clutch slip is clutch slip.

In a further aspect of the disclosed method, the clutch plant model inputs further comprise an estimate of hydraulic torque transmitted from an impeller to a turbine in the torque converter.

According to several aspects, a system includes a torque converter that includes a torque converter clutch, a torque generative device that provides torque to the torque converter, and an actuator that controls clutch pressure of the torque converter clutch. The system also includes a controller having a clutch plant model that predicts a value of a parameter that relates to torque converter clutch slip as a function of clutch plant model inputs comprising commanded clutch pressure and of torque from the torque generative device. The system further includes a model predictive controller that receives signals that allow determination of a desired value of the parameter that relates to torque converter clutch slip and a predicted value of the parameter that relates to torque converter clutch slip, receives a signal representing reported torque of the torque generative device, identifies an optimal commanded clutch pressure value that will result in an optimal value of an objective function based on the clutch plant model. and provides a command signal to the actuator effective to provide the optimal commanded clutch pressure value to the torque converter clutch.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

Embodiments of the invention will be described with reference to the accompanying drawings, in which.

DETAILED DESCRIPTION

The following description is merely exemplary in nature and is not intended to limit the present disclosure, application, or uses.

Figure 1:
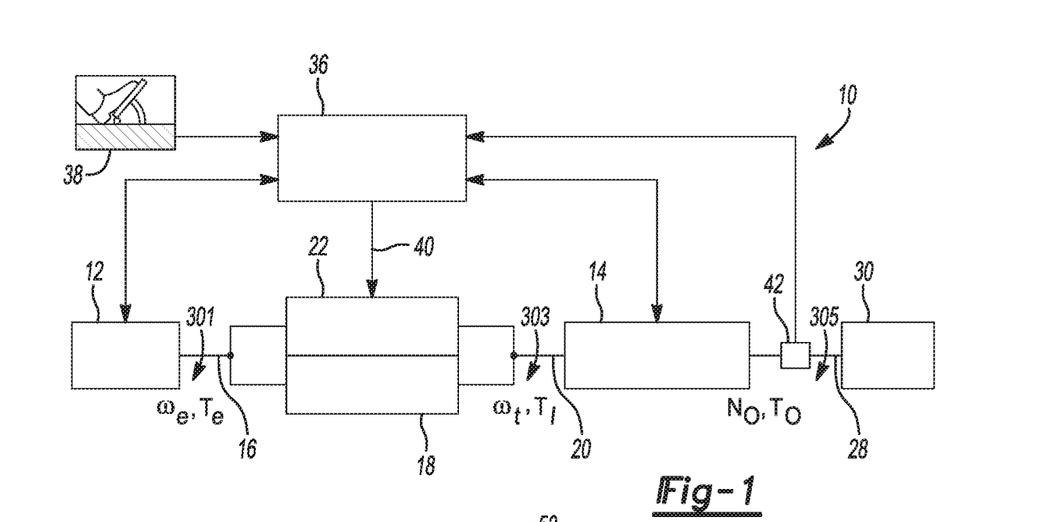
FIG. 1 is a block diagram showing exemplary powertrain components of a vehicle.

Referring now to the drawings, wherein the showings are for the purpose of illustrating certain exemplary embodiments only and not for the purpose of limiting the same, FIG. 1 is a block diagram of various powertrain components of a vehicle 10. The powertrain components include an engine 12 and a transmission 14. It is to be understood that reference to "engine 12" in this description is for convenience and is not limited to an internal combustion engine. The teachings of the present disclosure may be applied to any torque generative device 12, including but not limited to a gasoline engine, a diesel engine, and/or an electric motor.

An output shaft 16 of the engine 12 is coupled to the input (i.e. impeller or pump) of a torque converter 18, and an input shaft 20 of the transmission 14 is coupled to the output (i.e. turbine) of the torque converter 18. The torque converter 18 transfers rotational energy from the engine 12 to the transmission 14 using hydraulic fluid so that the engine 12 can be mechanically disengaged from the transmission 14 when necessary. A TCC 22, which can be actuated between a fully engaged position, a slip mode where slip occurs, and a fully disengaged position, applies a TCC torque for controlling a torque converter slip in the torque converter 18 between the engine 12 and the transmission 14. Engine output power 301 is depicted as engine rotational speed $\omega_e$ and engine torque $T_e$. Likewise, transmission input power 303 is depicted as transmission input speed (which is equal to torque converter turbine speed $\omega_t$) and transmission input torque $T_I$ (which is the sum of TCC clutch torque $T_c$ and hydraulic torque $T_h$ transmitted through the TCC turbine). The slip in the torque converter 18 is defined as $(\omega_e - \omega_t)$. An output shaft 28 of the transmission 14 is coupled to a driveline 30 of the vehicle 10 that distributes the engine power to the vehicle wheels in a manner that is well understood to those having ordinary skill in the art. Transmission output power 305 is depicted as the output speed $N_O$ and the output torque $T_O$.

The exemplary vehicle 10 also includes a controller 36 intended to represent both an engine controller and a transmission controller; however, it will be appreciated that these two controlling functions can be served by a single device or a plurality of communicatively connected devices. The controller 36 receives a throttle position signal from a vehicle throttle 38, and provides a signal to the engine 12 to provide the necessary engine speed and a signal to the transmission 14 to provide the necessary gear to satisfy the throttle demand. Additionally, the controller 36 provides a signal on line 40 to the TCC 22 to control an actuation pressure P to achieve the desired torque converter slip. According to one exemplary method, the desired torque converter slip is a function of a transmission gear state, an engine torque, and a turbine or input speed. Exemplary use of the input speed is used in this context as an indirect measure of output speed or vehicle speed. A sensor 42 measures the output behavior of the transmission 14. In one exemplary embodiment, the sensor 42 measures the rotational speed of the output shaft 28 of the transmission 14 and sends a speed signal to the controller 36. Suitable non-limiting examples for the sensor 42 include an encoder or a speed sensor.

The controller 36, as described above, can be a single device or a number of devices. Control module, module, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. Controller 36 has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular time intervals during ongoing engine and vehicle operation. Alternatively, algorithms may be executed in response to occurrence of an event.

Figure 2:
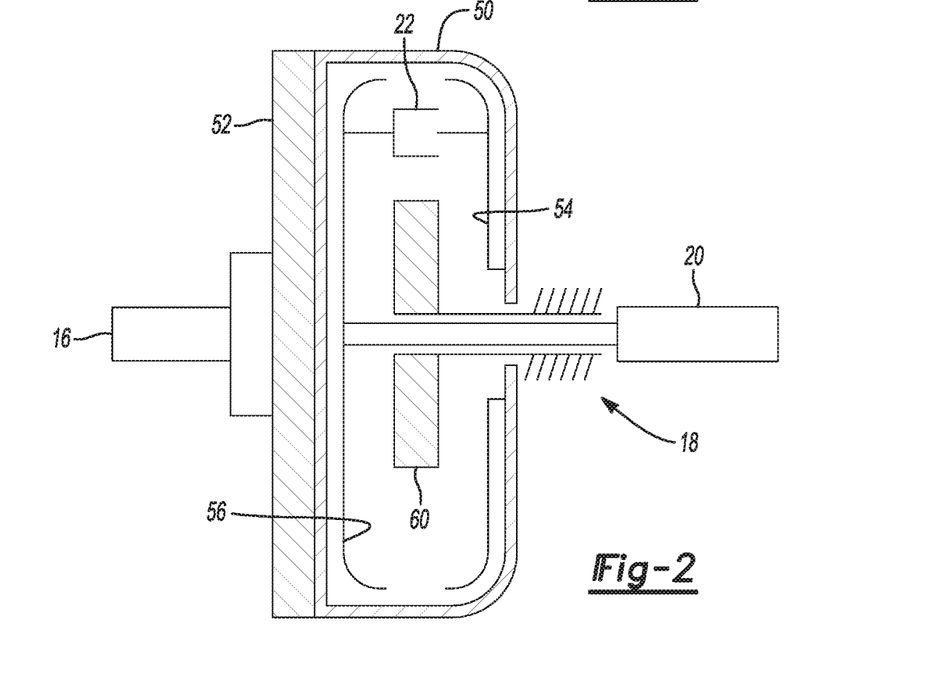
FIG. 2 is a schematic diagram of an exemplary torque converter as may be included in the exemplary powertrain of FIG. 1.

Referring now to FIG. 2, an exemplary torque converter 18 is illustrated that provides a fluid coupling between the engine 12 and the transmission 14. The torque converter 18 includes a housing 50 that is fixed for rotation with the engine output shaft 16, for example the engine crankshaft, via a flywheel 52. An impeller 54 is fixed for rotation with the housing 50, and a turbine 56 is fixed for rotation with a transmission input shaft 20. A stator 60 is also provided and is fixed from rotation. The interior of the torque converter 18 is filled with a viscous fluid. Rotation of the impeller 54 induces corresponding motion of the viscous fluid, which is directed towards the turbine 56 by the stator 60 to induce rotation of the turbine 56. While the coupling device 18 is described as a simplified torque converter, it should be appreciated that the coupling device 18 may take various other forms without departing from the scope of the present disclosure.

As the engine output shaft 16 rotates at an idle speed, the impeller 54 is induced to rotate. However, the idle speed is normally insufficient to overcome braking forces that inhibit the turbine 56 from rotating. As the braking forces are reduced or the engine speed increases, the impeller 54 drives the viscous fluid into the turbine 56 and the turbine 56 is induced to rotate. As a result, drive torque is transferred from the engine output shaft 16 through the transmission 14 to propel the vehicle. Upon achieving a point where there is little or no RPM difference between the turbine 56 and impeller 54, the TCC 22 may be engaged to provide a direct drive between the engine 12 and the transmission 14. Under this condition, the impeller 54 is mechanically coupled to the turbine 56, so that the rotational speed of the turbine 56 is about equal to the speed of the engine output shaft 16.

A slip mode of the TCC 22 is also provided. The slip is determined as the difference between the rotational speed of the engine output shaft 16 and the rotational speed of the transmission input shaft 20, where the transmission input shaft 20 is employed to transmit power from the coupling device 18 to the transmission 14. The slip mode occurs by changing a clutch actuation pressure P that is supplied to the TCC 22 by a hydraulic control system (not shown). The magnitude of the actuation pressure P is at about a maximum value when the TCC 22 is in the fully engaged position. As the actuation pressure P is decreased, the TCC 22 transitions from the fully engaged position to a fully disengaged position.

Torque converter slip can be controlled by application of TCC torque. The TCC includes structures mechanically, electronically, or fluidically operated to controllably couple the impeller and turbine of the torque converter, modulating an allowed slip therebetween. When the TCC is fully released, the fluidic interaction between the impeller and the turbine controls slip. The torque being transmitted through the torque converter is torque converter torque or turbine torque, transmitted in the fluidic interaction between the impeller and the turbine. TCC torque substantially equals zero when the TCC is fully released. When the TCC is fully locked, no slip between the impeller and turbine is possible, and the TCC torque equals the torque being transmitted through the torque converter. When the TCC is in a slip mode, the torque being transmitted through the torque converter includes some fraction of the torque as TCC torque, and the remainder of the torque being transmitted through the torque converter is turbine torque. In one exemplary control method, the pressure of hydraulic fluid to the TCC controls forces applied within the TCC and the resulting TCC torque so that the torque converter slip approaches a desired slip value or a reference slip. By reducing the pressure of the hydraulic fluid to the torque converter clutch, torque converter slip for a given operating condition will increase. Similarly, by increasing the pressure of the hydraulic fluid to the torque converter clutch, torque converter slip for a given operating condition will decrease.

Torque converter slip affects operation and drivability of the vehicle. Too much slip in steady state reduces fuel efficiency; too little slip in steady state results in reduced drivability. Too much or too little slip in transient conditions can cause a runaway slip condition, resulting in a loss of power to the output, or a locked-up clutch or clutch "crash" condition. As used herein, the term "TCC crash" refers to slip below a value calculated as (target slip minus an offset value).

However, a desired slip in a transition may not equal a desired slip in steady state conditions. For example, during a commanded acceleration, slip can be increased to a controlled level, allowing the engine to quickly accelerate, and then subsequently reduced to rapidly increase output torque through the transmission. Setting such a desired slip value for TCC control can be described as selecting a reference slip.

Figure 3:
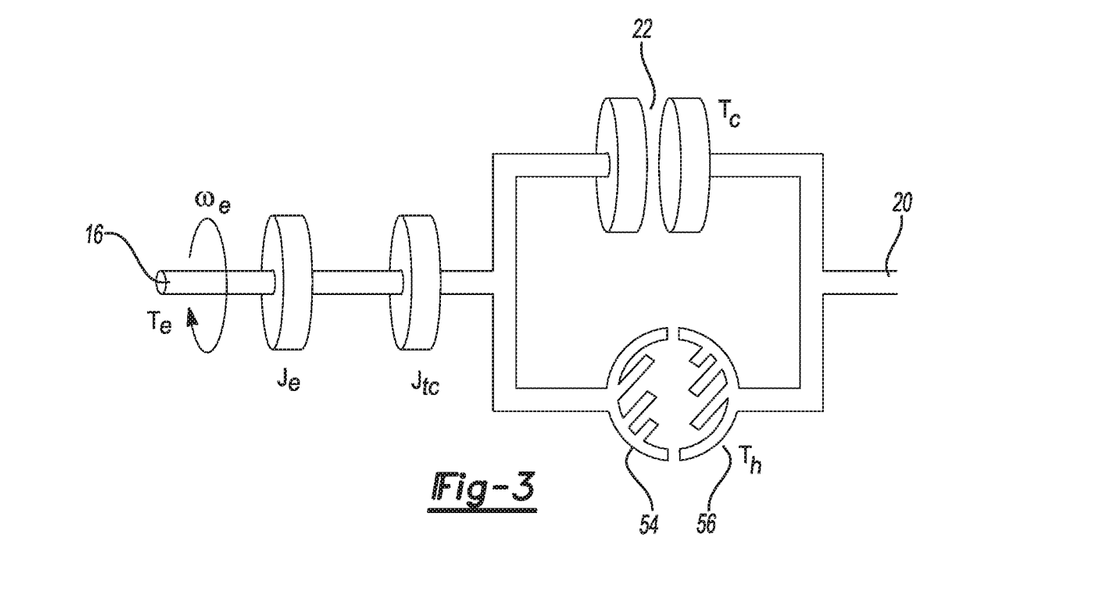
FIG. 3 depicts elements of an exemplary torque converter identifying torques and inertias that influence dynamic behavior of the torque converter.

Equations describing the dynamic behavior of a torque converter can be developed with reference to FIG. 3. The engine output shaft 16 rotates with an angular velocity $\omega_e$. The torque $T_e$ is the engine torque supplied at the engine output shaft 16. The inertia Je represents the rotational inertia of the engine crankshaft, and the inertia Jtc represents the rotational inertia of the torque converter pump side. The combined inertia Jt seen at the output shaft 16 is the sum of the engine crankshaft inertia Je and the torque converter inertia Jtc. The torque transmitted to the transmission input shaft 20 is the sum of the clutch torque $T_c$ transmitted by the clutch 22 and the hydraulic torque $T_h$ transmitted hydraulically from the impeller 54 to the turbine 56.

In Model Predictive Control, a discrete state space model is commonly expressed as:

$$x_{k+1}=Ax_k+Bu_k$$

$$y_k=Cx_k+Du_k$$

where x represents a model state matrix, y represents a model output matrix, u represents a model input matrix, and A, B, C, and D are coefficient matrices.

Figure 4:
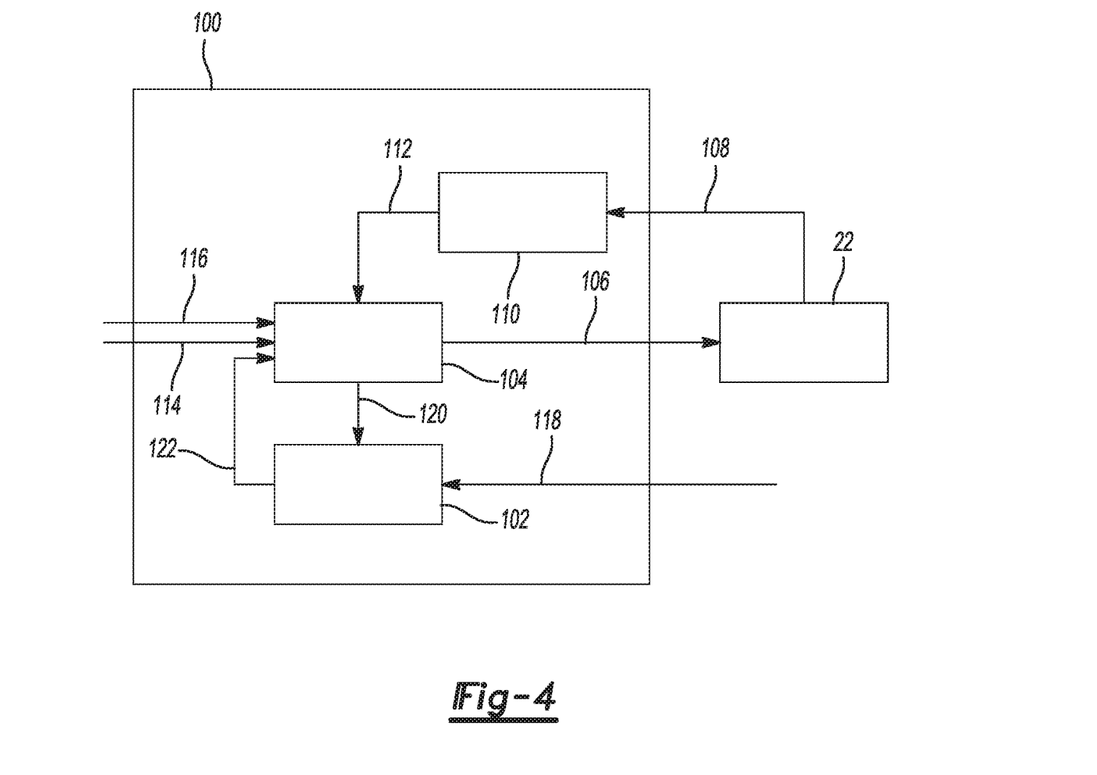
FIG. 4 is a block diagram that schematically depicts an exemplary MPC controller.

With reference to FIG. 4, an exemplary Model Predictive Control (MPC) controller 100 includes a plant model 102, control logic 104, and an observer 110. The control logic 104 provides a commanded control output signal 106 to the actual TCC 22. A signal 108 representing an actual operating condition of the TCC 22 is provided to an observer 110. The observer 110 provides information 112 derived from the signal 108 to the control logic 104. With continued reference to FIG. 4, an input signal 114 representing a desired operating point for the TCC is provided to the controller 104. The controller 104 accepts additional controller input signal(s) 116, and the plant model 102 accepts additional plant input signal(s) 118. The MPC controller 100 provides a proposed control signal 120 to the plant model 102. The plant model 102 provides a predicted plant response 122 based on the proposed control signal 120 and the plant model input signal(s) 118. A cost function is evaluated based on the desired operating point 114, additional controller input signals 116, the predicted plant response 122 and the proposed control signal 120. This process is iterated to find the optimal proposed control signal 120 that minimizes the value of the cost function. The controller 104 then provides the optimized control signal as the commanded control output signal 106 to the actual TCC. As the TCC responds to the new commanded control signal 106, the state of the system changes, and the controller 104 repeats the optimization process based on the new system state. Various embodiments as will be described below can be implemented using the exemplary controller 100 as shown in FIG. 4.

In a first exemplary embodiment, the plant model 102 is a linear model of a TCC. In this embodiment, the proposed control signal 120 is a proposed pressure command to the TCC model 102, and the predicted plant response 122 is a predicted slip level. The additional plant model input 118 is a reported engine torque signal, such as reported by an engine control module (ECM). The desired operating point 114 represents a desired TCC slip level. The additional controller input signal 116 represents engine torque. The commanded control output signal 106 is a command pressure signal to the actual TCC 22. Actual slip in the TCC 22 is observed and provided as the signal 112 to the controller 104.

For this first exemplary embodiment, the input and output terms in the discrete state space model may be represented as:

$$u = \begin{bmatrix} P_{Tcc} \\ T_e \end{bmatrix}$$

$$y = s$$

Where $P_{Tcc}$ represents TCC clutch activation pressure, $T_e$ represents engine torque, and s represents TCC clutch slip.

For this first exemplary embodiment, an exemplary cost function may include slip error, TCC input pressure rate of change, and TCC input reference pressure error integrals. The cost function may be expressed as:

$$\min \sum_{k=0}^{N-1} \|W^{slip}(s_{k+1} - s_{ref,k+1})\|^2 + \|W^{\Delta Ptcc}(\Delta P_{tcc,k})\|^2 + \|W^{PtccRef}(P_{tcc,k} - P_{tcc-ref,k})\|^2$$

where:

$$\Delta P_{tcc,k} \triangleq P_{tcc,k} - P_{tcc,k-1}$$

subject to the constraints:

$$P_{tcc,min,k} \leq P_{tcc,k} \leq P_{tcc,max,k} \; k=0, 1, \ldots, N-1$$

$$s_{min,k+1} \leq s_{k+1} \leq s_{max,k+1} \; k=0, 1, \ldots, N-1$$

$$\Delta P_{tcc-min,k} \leq \Delta P_{tcc,k} \leq \Delta P_{tcc-max,k} \; k=0, 1, \ldots, N-1$$

Weighting factors for the cost function for the first exemplary embodiment include $W^{slip}$, a weighting factor for slip error; $W^{\Delta Ptcc}$, a weighting factor for input pressure rate of change; and $W^{PtccRef}$, a weighting factor for input pressure reference error. Relative magnitudes of the individual weighting factors of a cost function can be adjusted to favor different performance criteria. Examples of TCC performance criteria include but are not limited to slip error (average absolute, mean, standard deviation, maximum), undershoot or overshoot of slip error, clutch energy, and avoidance of TCC "crashes". As used herein, the term "TCC crash" refers to slip below a value calculated as (target slip minus an offset value).

Figure 5:
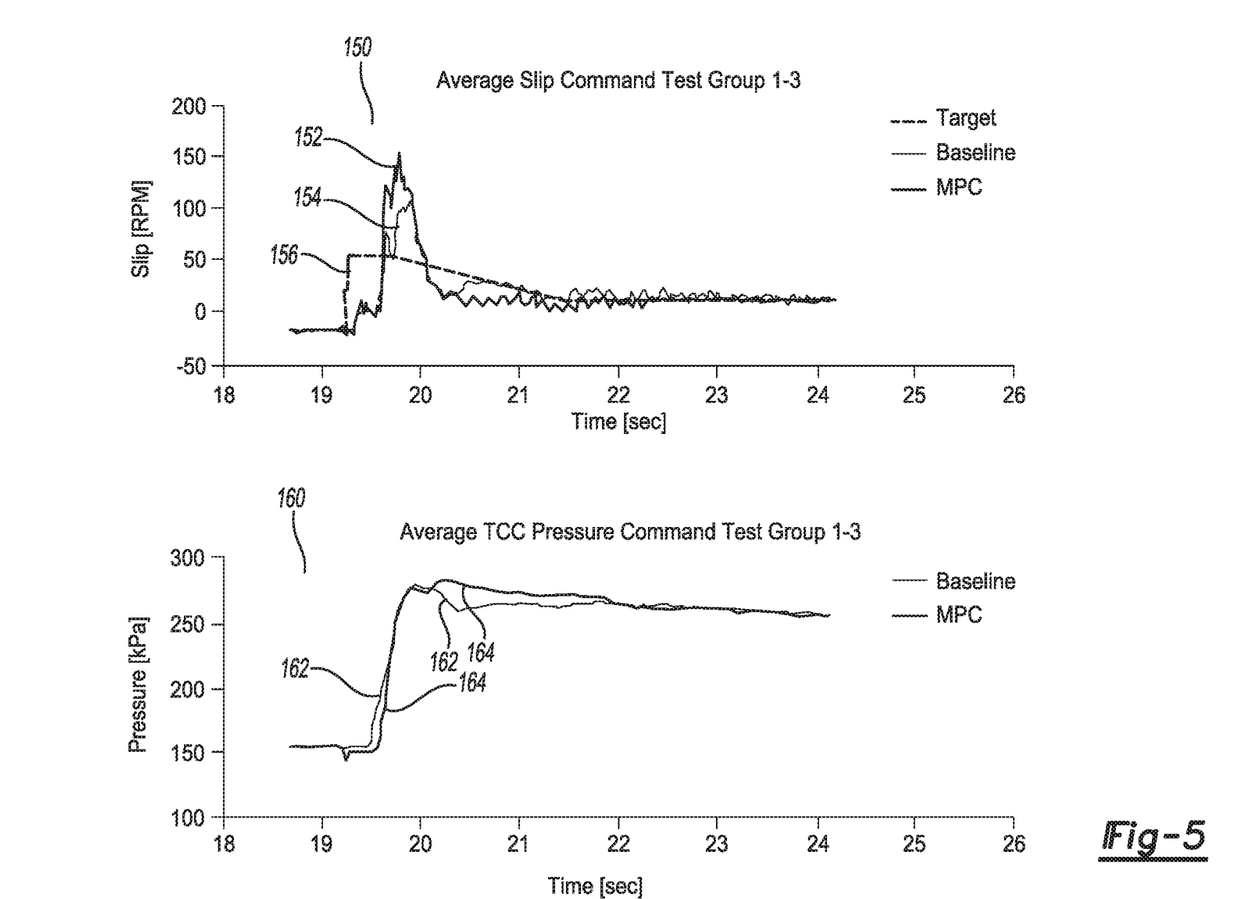
FIG. 5 is a chart that depicts the performance of a slip control system according to an exemplary embodiment.

FIG. 5 presents a comparison of slip control results between a baseline PID (proportional—integral—derivative) slip control system and an MPC slip control system according to the first exemplary embodiment described herein. The graph in FIG. 5 represents the response of both control systems to a 15% throttle tip-in maneuver. With reference to FIG. 5, the graph 150 is a plot having time in seconds represented on the x-axis and slip in rpm represented on the y-axis. In the graph 150, the trace 156 represents a target TCC slip value, such as would be provided as input 114 on FIG. 4 for the first exemplary embodiment. Trace 154 represents an actual TCC slip value such as would be provided as signal 112 on FIG. 4 for the first exemplary embodiment. Performance of a baseline PID slip control system subjected to the same 15% throttle tip-in maneuver is presented as trace 152 in FIG. 5. As seen in the graph 150, the performance of the MPC system according to the first exemplary embodiment compares favorably with the performance of the baseline system, with peak slip error reduced by about 50%. With continued reference to FIG. 5, the graph 160 is a plot having time in seconds represented on the x-axis and pressure in kPa represented on the y-axis. In graph 160, the trace 162 represents the commanded TCC pressure, such as would be provided to the TCC 22 as input 106 in FIG. 4, that resulted in the slip shown in trace 154 in graph 150. The trace 164 represents the commanded TCC pressure in the baseline PID system that resulted in the slip shown in trace 152 in graph 150. As will be appreciated from the results in graph 160, the MPC slip control system according to the first exemplary embodiment had lower peak TCC pressure and lower TCC pressure rate of change than the baseline PID system.

In a second exemplary embodiment, again with reference to FIG. 4, the plant model 102 is a model of a TCC 22. In this embodiment, the proposed control signal 120 is a proposed pressure command to the TCC model 102, and the predicted plant response 122 is a predicted clutch torque. The additional plant model input 118 is a reported engine torque signal, such as reported by an engine control module (ECM). The desired operating point 114 represents a desired TCC clutch torque level. The additional controller input signal 116 represents engine torque. The commanded control output signal 106 is a command pressure signal to the actual TCC 22. Estimated TCC clutch torque in the TCC 22 is calculated based on engine torque and observed TCC slip, and provided as the signal 112 to the controller 104.

Referring again to FIG. 3, the angular acceleration of the engine output shaft 16 is given by:

$$\dot{\omega}_e = \frac{1}{J_T}(T_e - T_h - T_c)$$

Using a k-factor torque converter model:

$$T_h = \frac{\omega_e^2}{k_f^2}$$

Slip is defined as: $s = \omega_e - \omega_t$ and slip error is defined as: $s_e = s - s_d$; where $s_d$ is desired slip.
The time rate of change of slip error is given by:

$$\dot{s}_e = \dot{\omega}_e - \dot{\omega}_t - \dot{s}_d = \frac{1}{J_T}\left(T_e - \frac{\omega_e^2}{k_f^2} - T_c\right) - \dot{\omega}_t - \dot{s}_d$$

Solving for $T_c$:

$$T_c = T_e - \frac{\omega_e^2}{k_f^2} + J_T(-\dot{s}_e - \dot{\omega}_t - \dot{s}_d)$$

In an aspect of this second embodiment, a clutch plant model relates the clutch torque $T_c$ to engine torque $T_e$ and to a commanded torque actuation pressure $P_{Tcc}$. In the following discussion, to simplify the notation by reducing the number of subscript levels the variable name CltTrq is used to represent the clutch torque $T_c$.

For this second exemplary embodiment, the input and output terms in the discrete state space model may be represented as:

$$u = [P_{Tcc}]$$

$$y = \text{CltTrq}$$

Where $P_{Tcc}$ represents TCC clutch activation pressure and CltTrq represents TCC clutch torque.

For this second exemplary embodiment, an exemplary cost function may include clutch torque error, TCC input pressure rate of change, and TCC input reference pressure error integrals. The cost function may be expressed as:

$$\min \sum_{k=0}^{N-1} \|W^{CltTrq}(CltTrq_{k+1} - CltTrq_{ref,k+1})\|^2 +$$

$$\|W^{\Delta Ptcc}(\Delta P_{tcc,k})\|^2 + \|W^{PtccRef}(P_{tcc,k} - P_{tcc-ref,k})\|^2$$

where:

$$\Delta P_{tcc,k} \triangleq P_{tcc,k} - P_{tcc,k-1}$$

subject to the constraints:

$$P_{tcc,min,k} \leq P_{tcc,k} \leq P_{tcc,max,k} \quad k=0, 1, \ldots, N-1$$

$$CltTrq_{min,k+1} \leq CltTrq_{k+1} \leq CltTrq_{max,k+1} \quad k=0, 1, \ldots, N-1$$

$$\Delta P_{tcc-min,k} \leq \Delta P_{tcc,k} \leq \Delta P_{tcc-max,k} \quad k=0, 1, \ldots, N-1$$

Weighting factors for the cost function for the second exemplary embodiment include $W^{CltTrq}$, a weighting factor for clutch torque error; $W^{\Delta Ptcc}$, a weighting factor for input pressure rate of change; and $W^{PtccRef}$, a weighting factor for input pressure reference error. Relative magnitudes of the individual weighting factors of a cost function can be adjusted to favor different performance criteria. Examples of TCC performance criteria include but are not limited to slip error (average absolute, mean, standard deviation, maximum), undershoot or overshoot of slip error, clutch energy, and avoidance of TCC "crashes". As used herein, the term "TCC crash" refers to slip below a value calculated as (target slip minus an offset value).

In a third exemplary embodiment, again with reference to FIG. 4, the plant model 102 is a nonlinear model of a TCC described by a linear system with nonlinear disturbances including engine torque, nonlinear part of hydraulic torque, and shaft torsional vibrations. In an aspect of this third embodiment, hydraulic torque in the operating range of interest is approximated by a second order polynomial of slip; i.e. $T_h \approx a(\text{slip}) + b(\text{slip})^2$. In this embodiment, the proposed control signal 120 is a proposed pressure command to the TCC model 102, and the predicted plant response 122 is a predicted slip level. The additional plant model inputs 118 include a reported engine torque signal, such as reported by an engine control module (ECM). The additional plant model inputs 118 also include a hydraulic torque signal. The desired operating point 114 represents a desired TCC slip level. The additional controller input signal 116 represents engine torque. The commanded control output signal 106 is a command pressure signal to the actual TCC 22. Actual slip in the TCC 22 is observed and provided as the signal 112 to the controller 104.

For this third exemplary embodiment, the input and output terms in the discrete state space model may be represented as:

$$u = \begin{bmatrix} P_{Tcc} \\ T_e \\ T_h \end{bmatrix}$$

$$y = s$$

Where $P_{Tcc}$ represents TCC clutch activation pressure, $T_e$ represents engine torque, $T_h$ represents hydraulic torque transmitted by the torque converter, and s represents TCC clutch slip.

For this third exemplary embodiment, an exemplary cost function may include slip error, TCC input pressure rate of change, and TCC input reference pressure error integrals. The cost function may be expressed as:

$$\min \sum_{k=0}^{N-1} \|W^{slip}(s_{k+1} - s_{ref,k+1})\|^2 +$$

$$\|W^{\Delta Ptcc}(\Delta P_{tcc,k})\|^2 + \|W^{PtccRef}(P_{tcc,k} - P_{tcc-ref,k})\|^2$$

where:

$$\Delta P_{tcc,k} \triangleq P_{tcc,k} - P_{tcc,k-1}$$

subject to the constraints:

$$P_{tcc,min,k} \leq P_{tcc,k} \leq P_{tcc,max,k} \quad k=0, 1, \ldots, N-1$$

$$s_{min,k+1} \leq s_{k+1} \leq s_{max,k+1} \quad k=0, 1, \ldots, N-1$$

$$\Delta P_{tcc-min,k} \leq \Delta P_{tcc,k} \leq \Delta P_{tcc-max,k} \quad k=0, 1, \ldots, N-1$$

Weighting factors for the cost function for the first exemplary embodiment include $W^{slip}$, a weighting factor for slip error; $W^{\Delta Ptcc}$, a weighting factor for input pressure rate of change; and $W^{PtccRef}$, a weighting factor for input pressure reference error. Relative magnitudes of the individual weighting factors of a cost function can be adjusted to favor different performance criteria. Examples of TCC performance criteria include but are not limited to slip error (average absolute, mean, standard deviation, maximum), undershoot or overshoot of slip error, clutch energy, and avoidance of TCC "crashes".

A control system of the present disclosure offers several advantages. These include improving slip control performance at operating points that are difficult to control using feedback and/or feedforward control systems. Additionally, a control system of the present disclosure streamlines and reduces calibration effort, and provides a systematic approach to calibration. A control system according to the present disclosure accounts for different objective measures, such as slip error, input pressure rate of change, etc., and allows these measures to be weighted to provide a desired driving experience based on the vehicle type. A control system of the present disclosure is capable of reacting to predicted disturbances.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A control system to control slip of a torque converter clutch in a powertrain comprising a torque generative device and a torque converter comprising a torque converter clutch, the control system comprising:
   a clutch plant model configured to predict a predicted value of a parameter that relates to torque converter clutch slip as a function of clutch plant model inputs comprising commanded clutch pressure and of a torque from the torque generative device; and
   a model predictive controller configured to:
   receive signals that allow determination of a desired value of the parameter that relates to torque converter clutch slip;
   receive a signal representing reported torque of the torque generative device;
   identify an optimal commanded clutch pressure value that will result in an optimal value of an objective function based on the clutch plant model, wherein the objective function includes a difference between the desired parameter and the predicted value of the parameter that relates to clutch slip, rate of change of clutch pressure, and a difference between a desired and a predicted value of commanded clutch pressure; and
   provide a command signal to an actuator effective to control commanded clutch pressure to the torque converter clutch.

2. The control system of claim 1, wherein the objective function includes constraints on the commanded clutch pressure, on the rate of change of clutch pressure, and on the parameter that relates to clutch slip.

3. The control system of claim 1, wherein the model predictive controller receives inputs comprising the desired value of the parameter that relates to clutch slip, the predicted value of the parameter that relates to clutch slip, and the torque from the torque generative device.

4. The control system of claim 1, wherein the parameter that relates to clutch slip is clutch torque.

5. The control system of claim 4, wherein the clutch torque is calculated based in part on an estimate of hydraulic torque transmitted from an impeller to a turbine in the torque converter.

6. The control system of claim 5, wherein the estimate of hydraulic torque is based on a k-factor calculation.

7. The control system of claim 1, wherein the parameter that relates to clutch slip is clutch slip.

8. The control system of claim 7, wherein the clutch plant model inputs further comprise an estimate of hydraulic torque transmitted from an impeller to a turbine in the torque converter.

9. The control system of claim 8, wherein the hydraulic torque is estimated by a second order polynomial of slip.

10. A method of controlling slip of a torque converter clutch in a powertrain comprising a torque generative device and a torque converter comprising a torque converter clutch, the method comprising:
    predicting in a clutch plant model a predicted value of a parameter that relates to torque converter clutch slip as a function of clutch plant model inputs comprising commanded clutch pressure and of torque from the torque generative device; and
    receiving in a model predictive controller signals that allow determination of a desired value of the parameter that relates to torque converter clutch slip;
    receiving in the model predictive controller a signal representing reported torque of the torque generative device;
    identifying in the model predictive controller an optimal commanded clutch pressure value that will result in an optimal value of an objective function based on the clutch plant model, wherein the objective function includes a difference between the desired and predicted values of the parameter that relates to clutch slip, rate of change of clutch pressure, and a difference between a desired and a predicted value of commanded clutch pressure; and
    providing a command signal to an actuator effective to control commanded clutch pressure to the torque converter clutch.

11. The method of claim 10, wherein the objective function includes constraints on the commanded clutch pressure, on the rate of change of clutch pressure, and on the parameter that relates to clutch slip.

12. The method of claim 10, wherein the model predictive controller receives inputs comprising the desired value of the parameter that relates to clutch slip, the predicted value of the parameter that relates to clutch slip, and the torque from the torque generative device.

13. The method of claim 10, wherein the parameter that relates to clutch slip is clutch torque.

14. The method of claim 13, wherein the clutch torque is calculated based in part on an estimate of hydraulic torque transmitted from an impeller to a turbine in the torque converter.

15. The method of claim 14, wherein the estimate of hydraulic torque is based on a k-factor calculation.

16. The method of claim 10, wherein the parameter that relates to clutch slip is clutch slip.

17. The method of claim 16, wherein the clutch plant model inputs further comprise an estimate of hydraulic torque transmitted from an impeller to a turbine in the torque converter.

18. A system comprising:
    a torque converter that includes a torque converter clutch;
    a torque generative device that provides torque to the torque converter;
    an actuator that controls clutch pressure of the torque converter clutch;
    a controller having:
    a clutch plant model that predicts a predicted value of a parameter that relates to torque converter clutch slip as a function of clutch plant model inputs comprising commanded clutch pressure and of torque from the torque generative device; and
    a model predictive controller that:
    receives signals that allow determination of a desired value of the parameter that relates to torque converter clutch slip;

receives a signal representing reported torque of the torque generative device;

identifies an optimal commanded clutch pressure value that will result in an optimal value of an objective function based on the clutch plant model, wherein the objective function includes a difference between the desired and predicted values of the parameter that relates to clutch slip, rate of change of clutch pressure, and a difference between a desired and a predicted value of commanded clutch pressure; and provides a command signal to the actuator effective to provide the optimal commanded clutch pressure value to the torque converter clutch.

* * * * *